United States Patent [19]

Norota et al.

[11] Patent Number: 5,928,589
[45] Date of Patent: Jul. 27, 1999

[54] PROCESSING FOR PRODUCING SHAPED WHOLLY AROMATIC POLYAMIDE RESIN COMPOSITION ARTICLE AND SHAPED ARTICLE PRODUCED THEREBY

[75] Inventors: Susumu Norota; Tadao Komoriya; Mitsuo Kuwabara, all of Ibaraki; Akira Kobayashi, Takatsuki; Hiroyuki Adachi, Ibaraki, all of Japan

[73] Assignee: Teijin Limited, Osaka, Japan

[21] Appl. No.: 07/784,687

[22] Filed: Oct. 30, 1991

Related U.S. Application Data

[63] Continuation-in-part of application No. 07/288,305, Dec. 21, 1988, abandoned.

[30] Foreign Application Priority Data

Dec. 28, 1987 [JP] Japan .................................. 62-330220
Jul. 29, 1988 [JP] Japan .................................. 63-188333
Jul. 29, 1988 [JP] Japan .................................. 63-188334

[51] Int. Cl.$^6$ ..................................................... D04H 3/16
[52] U.S. Cl. .......................... 264/115; 264/120; 264/122; 264/127
[58] Field of Search .................................. 264/120, 122, 264/127, 175, 115

[56] References Cited

U.S. PATENT DOCUMENTS

| | | | |
|---|---|---|---|
| 3,908,038 | 9/1975 | Niehart et al. .......................... | 525/178 |
| 4,153,661 | 5/1979 | Ree et al. ................................ | 264/120 |
| 4,183,887 | 1/1980 | Karg ........................................ | 264/130 |
| 4,218,362 | 8/1980 | Honjo et al. ............................. | 525/165 |
| 4,491,553 | 1/1985 | Yamada et al. .......................... | 264/51 |
| 5,312,576 | 5/1994 | Swei et al. ............................... | 264/127 |
| 5,385,780 | 1/1995 | Lee .......................................... | 264/127 |

Primary Examiner—Pamela R. Schwartz
Assistant Examiner—J. M. Gray
Attorney, Agent, or Firm—Burgess, Ryan and Wayne

[57] ABSTRACT

A shaped wholly aromatic polyamide resin composition article having an excellent mechanical strength, stain-proof property and antistatic property, and comprising a wholly aromatic polyamide resin matrix and a dispersoid comprising polytetrafluoroethylene resin particles in the form of fine networks of fibrils and, optionally, additional inorganic particles, dispersed in the matrix, is produced by mixing an aqueous dispersion of PTFE particles having an average size of 0.3 to 3 μm in an amount of 0.01% to 10% based on the total weight of the shaped article, with wholly aromatic polyamide particles having a melting point of at least 50° C. higher than that of PTFE and composed of porous secondary particles having an average size of 30 to 200 μm and consisting of primary particles having an average size of 0.1 to 2.0 μm; drying the mixture to provide composite particles composed of aromatic polyamide cores and PTFE coating layers on the cores; and shaping a feed powder comprising the composite particles at a temperature not lower than the glass-transition point but not lower than the melting point or heat decomposition point of the aromatic polyamide, under a pressure.

14 Claims, 6 Drawing Sheets

PROCESSING FOR PRODUCING SHAPED WHOLLY AROMATIC POLYAMIDE RESIN COMPOSITION ARTICLE AND SHAPED ARTICLE PRODUCED THEREBY

CROSS REFERENCE TO RELATED APPLICATION

This application is a continuation-in-part application of application Ser. No. 07/288,305, filed on Dec. 21, 1988, now abandoned.

BACKGROUND OF THE INVENTION (1) Field of the Invention

The present invention relates to a process for producing a shaped wholly aromatic polyamide resin composition article, and a shaped article produced thereby. More particularly, the present invention relates to a process for producing shaped wholly aromatic polyamide resin composition article reinforced with polytetrafluoroethylene resin fibrils at a high efficiency, and a shaped article produced thereby.

(2) Description of the Related Art

It is known that wholly aromatic polyamide resins, for example, poly-m-phenyleneisophthalamide (PMIA) resin, have a high glass transition temperature of about 280° C., a high melting temperature of about 430° C., and a limiting oxygen index of about 30, and thus the mechanical properties thereof have a very low temperature dependency. The conventional wholly aromatic polyamide resins have an excellent heat resistance and flame retardance, and therefore, those wholly aromatic polyamide resin are used for producing various shaped articles, for example, fibers, films, sheets, and other compress-molded articles.

In the production of the shaped article from the wholly aromatic polyamide resin, since the melting point is very close to the heat decomposition temperature thereof, it is believed that the wholly aromatic polyamide resin cannot be melt-molded. Therefore, in the prior art, the wholly aromatic polyamide resin has been molded by a solution-molding method or a compression molding method at a temperature lower than the melting point thereof.

In the solution-molding method in which a solution of a resin in a medium (solvent) is shaped, a medium (solvent) must be removed from the resultant shaped article.

Therefore, this solution molding method is applicable only for the production of fine fibers having a denier of several tens or less or a thin film having a thickness of about 100 $\mu$m or less, and is not suitable for producing a thick article for example, a thick plate, pipe or bar.

Also, it is practically impossible to produce fine articles such as fibers or films by the compression molding method.

Accordingly, it was believed that the production of bristles having a relatively large thickness could not be obtained from the poly-m-phenyleneisophthalamide type aromatic polyamide (PMIA) resins.

The inventors of the present invention attempted to provide the bristles from the PMIA resins, and were successful in that they provided methods of producing the bristles from the PMIA resins by an instantaneous plastify-molding. These methods are disclosed by Japanese Unexamined Patent Publication (Kokai) Nos. 57-192436, 58-109618, 58-109619, 59-144607, 61-245305.

The inventors of the present invention further attempted to develop new uses for the PMIA bristles in various fields; and found that the PMIA bristles can be used for a heat resistant brush having a stain-proof property. The stain-proof property was obtained by coating the surfaces of the PMIA bristles with a stain-proofing material, for example, a silicone or fluorine compound type stain-proofing agent, but the coating of the stain-proofing agents on the bristles exhibited a poor durability when the bristles were subjected to a large friction by rubbing, for example, when used as a brush, and thus could not be practically used.

The inventors of the present invention then attempted to produce bristles by mixing a polytetrafluoroethylene powder with a PMIA powder, compression-molding the mixed powder into a plate-like article, and forming the bristles from the plate-like article in accordance with the method disclosed in Japanese Unexamined Patent Publication (Kokai) No. 61-245305. In this attempt, it was found that, when the content of the polytetrafluoroethylene was 5% by weight or more, the formation of the bristles was very difficult and when the content of the polytetrafluoroethylene was less than 5% by weight, the resultant bristles were disadvantageous in that they had undesirably rough surfaces and significantly lower mechanical properties, for example, tensile strength, and that the stain-proofing property of the bristles was poor, and thus the attempt was unsuccessful.

The causes of the failure of the attempt are assumed to be as follows.

(1) Since fine polytetrafluoroethylene particles (primary particles) are easily aggregated to form secondary particles having a large size, it is difficult to evenly mix the fine polytetrafluoroethylene particles with the PMIA powder.

(2) The polytetrafluoroethylene resin exhibits an extremely higher melt viscosity than the melt viscosity of the PMIA resin of $10^{11}$ to $10^{12}$ poise at a temperature of 340° C. to 380° C. at which the PMIA bristles are produced, and a very poor fiber-forming property. Therefore, when the polytetrafluoroethylene particles are dispersed in a matrix consisting of the PMIA resin in the bristle-forming procedure, the polytetrafluoroethylene particles exhibit a remarkably different fluidizing behavior from that of the PMIA resin matrix, and thus the polytetrafluoroethylene particles remain independent from the matrix.

Accordingly, a demand arose for the provision of a new shaped PMIA resin article having a satisfactory stain-proof property and mechanical properties.

The inventors of the present invention further attempted to provide a heat resistant abrasive brush from the bristles comprising a PMIA resin matrix and inorganic abrasive grains, for example, alumina or carborundum grains, dispersed in the matrix. This abrasive brush is disclosed in Japanese Unexamined Patent Publication (Kokai) No. 58-136829.

It was found that the brush had an excellent heat resistance and a satisfactory abrasive effect, and thus was usable as a heat resistant abrasive brush, but it was also found that the abrasive grains were evenly distributed in the PMIA resin matrix, and therefore, the resultant bristles exhibited a low tensile strength and ultimate elongation, and a poor flexural strength.

To overcome the above-mentioned disadvantages, the inventors of the present invention attempted to provide a new type of bristles having a flat cross-sectional profile and comprising an abrasive flat layer consisting of a mixture of the PMIA resin and the abrasive grains and a non-abrasive flat layer adhered to the abrasive flat layer in the side-by-side (bimetal) form consisting of the PMIA resin and not containing the abrasive grains. These flat abrasive hard fibers are disclosed by Japanese Unexamined Patent Publication (Kokai) No. 63-21920.

The abrasive brush made from these flat hard fibers was satisfactory in that it had a high flexural strength and a superior abrasive property, but the abrasive brush was not always satisfactory from the following viewpoints:

(1) In view of the handling in production and the use of the brush, bristles having a circular cross-sectional profile are sometimes necessary.

(2) For the provision of soft abrasive brushes and abrasive non-woven fabrics, the abrasive grains must be distributed in the entire outer surfaces of the bristles.

Accordingly, a new type of the PMIA resin bristle free from the above-mentioned disadvantages was demanded.

As stated above, the conventional PMIA resin articles are usually produced by the compression-molding method. The conventional compression molding method is disadvantageous from the following viewpoints.

(1) The molding procedure takes a long time, exhibits a low efficiency, and thus has a high cost.

(2) It is difficult to produce shaped articles having large dimensions, for example, very long and/or thick articles.

Therefore, a demand arose for the provision of a new process for producing large size articles from a PMIA resin.

SUMMARY OF THE INVENTION

An object of the present invention is to provide a process for producing a shaped wholly aromatic polyamide resin composition article having satisfactory mechanical properties and stain-proof properties at a high productivity, and a shaped article produced thereby.

The above-mentioned object can be realized by the process of the present invention for producing a shaped wholly aromatic polyamide resin composition article, which comprises the steps of:

mixing an aqueous dispersion of polytetrafluoroethylene resin particles in an amount of 0.01% to 10% based on the total weight of the shaped article, and having an average size of from 0.3 to 3 μm, with wholly aromatic polyamide resin particles having a melting temperature of at least 50° C. above that of the polytetrafluoroethylene resin particles and composed of a plurality of primary particles having an average size of from 0.1 to 2.0 μm and aggregated with each other to form secondary porous particles having an average size of from 30 to 200 μm;

drying the resultant aqueous mixture to provide a dried product comprising coated composite particles which are composed of cores consisting of the wholly aromatic polyamide resin particles and coating layers formed on the cores and consisting of the polytetrafluoroethylene resin particles;

preparing a shaping feed powder consisting of a member selected from the group consisting of the product of the drying step and mixtures of the product of the drying step with an addition amount of the wholly aromatic polyamide resin particles; and subjecting the shaping feed powder to a shaping procedure at a temperature identical to or higher than the glass transition temperature of the wholly aromatic polyamide resin but lower than the melting or heat decomposition temperature thereof, under a pressure, to provide a shaped article wherein the polytetrafluoroethylene resin particles are in the form of fibrils dispersed in a matrix consisting of the wholly aromatic polyamide resin and connected to each other to form fine networks of the fibrils in the matrix.

In the mixing step of the above-mentioned process, the aqueous dispersion of the polytetrafluoroethylene resin particles is optionally mixed with additional inorganic particles in addition to the aromatic polyamide resin particles.

The shaped wholly aromatic polyamide resin composition article produced by the above-mentioned process comprises a matrix consisting essentially of a wholly aromatic polyamine resin; and a dispersoid comprising polytetrafluoroethylene particles in an amount of 0.01% to 10% based on the total weight of the shaped article, and in the form of fibrils dispersed in the matrix and connected to each other to form fine networks of the fibrils in the matrix.

The above-mentioned dispersoid optionally further comprises additional inorganic particles dispersed together with the polytetrafluoroethylene particles in the matrix.

DESCRIPTION OF THE PREFERRED EMBODIMENTS

In the process of the present invention, a shaped wholly aromatic polyamide resin composition article is produced by the steps of mixing an aqueous dispersion of polytetrafluoroethylene resin particles in an amount of 0.01% to 10% based on the total weight of the shaped article, and having an average size of from 0.3 to 3 μm, with wholly aromatic polyamide resin particles having a melting temperature of at least 50° C. above that of the polytetrafluoroethylene resin particles and composed of a plurality of primary particles having an average size of from 0.1 to 2.0 μm and aggregated with each other to form secondary porous particles having an average size of from 30 to 200 μm;

drying the resultant aqueous mixture to provide a drying product comprising coated composite particle which are composed of cores consisting of the wholly aromatic polyamide resin particles and coating layers formed on the cores and consisting of the polytetrafluoroethylene resin particles;

preparing a shaping feed powder consisting of a member selected from the group consisting of the product of the drying step and mixtures of the product of the drying step with an addition amount of the wholly aromatic polyamide resin particles; and subjecting the shaping feed powder to a shaping procedure at a temperature identical to or higher than the glass transition temperature of the wholly aromatic polyamide resin but lower than the melting or heat decomposition temperature thereof, under a pressure, to provide a shaped article.

The shaped article produced by the process of the present invention comprises a matrix consisting essentially of a wholly aromatic polyamide resin and a dispersoid comprising polytetrafluoroethylene (PTFE) resin particles which are in the form of fibrils dispersed in the aromatic polyamide resin matrix, and connected to each other to form fine networks of the fibrils in the matrix.

The wholly aromatic polyamide resin usable for the present invention has a melting temperature of at least 50° C. higher than the melting temperature of the polytetrafluoroethylene resin, and preferably comprises at least one type of aromatic polyamide polymer having at least 85 molar % of recurring m-phenyleneisophthal-amide units of the formula:

The aromatic polyamide polymer may be a homopolymer consisting of the above-mentioned recurring units or copolymer containing 85 molar % or more or the above-mentioned recurring units and 15 molar % or less of other recurring units, for example, recurring m-xyleneiso-phthalamide or m-phenyleneterephthalamide units.

The wholly aromatic polyamide polymer is prepared by poly-condensing an aromatic diamine composition consisting of m-phenylene diamine and, optionally, one or more aromatic diamines with an aromatic dicarboxylic acid composition consisting of isophthalic acid, anhydride or other functional derivative thereof and, optionally, at least one other aromatic dicarboxylic acid, for example, terephthalic acid or 2,6-naphthalene dicarboxylic acid.

The poly-m-phenyleneisophthalamide type aromatic polyamide polymer is preferably produced by the interfacial polycondensation method disclosed in Japanese Examined Patent Publication (Kokoku) No. 47-10863, as this method can supply a wholly aromatic polyamide resin powder very suitable as a component of the resin composition for the present invention. Namely, the aromatic polyamide resin particles produced by the above-mentioned method have a very small primary particle size of about 1 μm. The primary particles are aggregated to each other and form secondary porous particles having a size of 30 to 200 μm.

In the shaped article of the present invention, the PTFE particles are in the form of fine fibrils connected to each other to form fine networks of the fibrils in the matrix. The networks are very fine and thus are difficult to directly observe, but when the shaped article of the present invention is immersed in a solvent for the aromatic polyamide resin, for example, concentrated sulfuric acid, N-methylpyrrolidone, N,N-dimethylformamide or N,N-dimethylacetamide, to dissolve the aromatic polyamide resin matrix in the solvent, and a non-dissolved fraction is separated from the solvent, it can be seen that the non-dissolved fraction is in the form of fine networks by placing a portion of the non-dissolved fraction as a specimen on a glass plate, dropping a solvent onto the specimen, placing a slide glass over the specimen, and observing the specimen by a microscope at a magnification of 50 to 100.

The fine networks of the fine PTFE resin fibrils have the form of a blood capillary structure of the organism.

Figure 1:
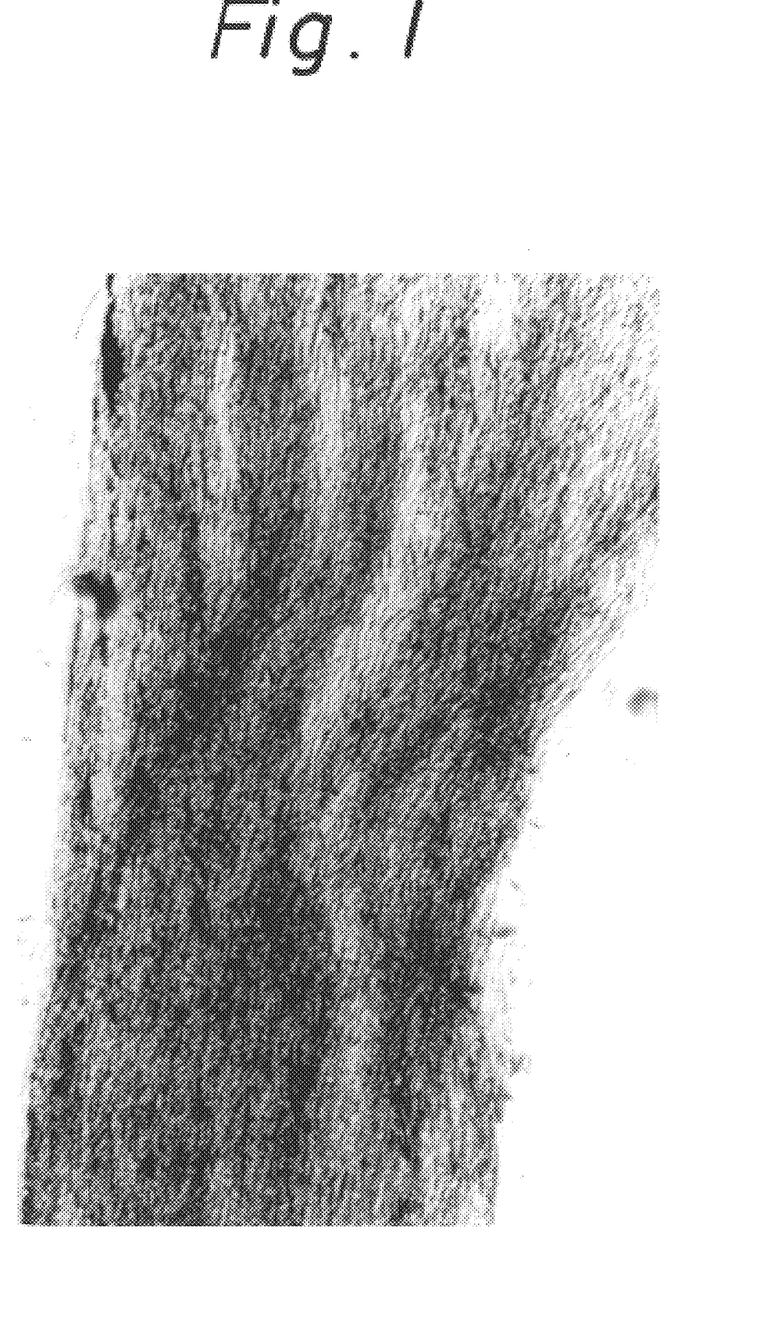
FIG. 1 shows a microscopic view of polytetrafluoroethylene particles in the form of fine networks of fibrils formed in a matrix consisting of an aromatic polyamide resin, in an embodiment of the shaped wholly aromatic polyamide resin composition article of the present invention.

FIG. 1 shows a microscopic view of a specimen consisting of a number of PTFE resin particles in the form of fine networks of fibrils. The specimen was prepared by immersing a monofilament of the present invention containing 2.0% by weight of PTFE resin particles dispersed in a poly-m-phenyleneisophthalamide resin matrix, in a solvent consisting of N-methylpyrrolidone at room temperature to remove the matrix, taking up the non-dissolved fraction in the form of white filaments from the solvent, and taking a microscopic photograph of the fraction at a magnification of 150 in the above-mentioned manner.

FIG. 1 clearly shows that the PTFE resin fibrils are connected to each other and form a fine network in the form of a blood capillary structure in the organism.

The shaped article of the present invention is produced in any form; for example, in the form of a fiber, filament, bristle, film, sheet, plate, pipe or rod.

The shaped article of the present invention has a uniform structure in which the PTFE resin particles are evenly distributed throughout the aromatic polyamide resin matrix, or a non-uniform structure in which the PTFE resin particles are unevenly or locally distributed in the matrix. For example, the PTFE resin particles are distributed only in local portions of the matrix. In the cross-sectional profile of a shaped article of the present invention, shown in FIG. 2, a number of dispersoid particles 1 comprising the PTFE resin particles in the form of fibrils are distributed in an aromatic polyamide matrix 2 only in portions close to outer surfaces 1a of the article; i.e., an inside portion 2a of the article is composed of only the aromatic polyamide resin matrix 2.

In an embodiment of the shaped article of the present invention, the distribution density of the dispersoid comprising the PTFE resin particles in the matrix varies stepwise from an outer surface to the inside of the article.

Figure 2:
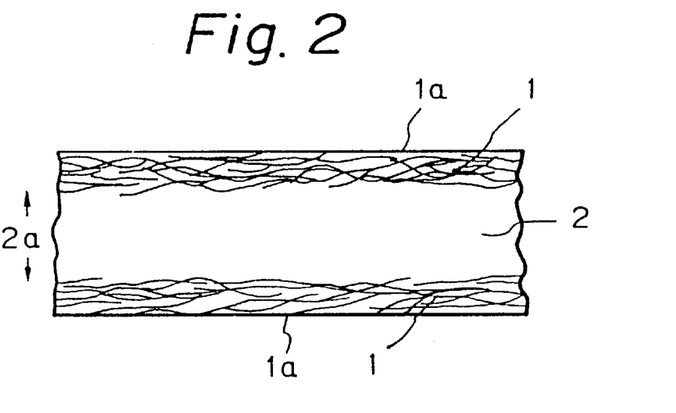
FIG. 2 shows a cross-sectional profile of an embodiment of the shaped article of the present invention in which the polytetrafluoroethylene resin particles in the form of fibrils are locally distributed in the matrix of the matrix.

In this embodiment, the physical and chemical properties of some portions of the shaped article are different from the other portions thereof. For example, in the shaped article as shown in FIG. 2, the surface portions exhibit a stain-proof property due to the PTFE resin particles located in the portions and the inside portion exhibits a high mechanical strength due to the absence of the PTFE resin particles.

In the shaped resin composition article of the present invention, the PTFE resin particles are in an amount of from 0.01% to 10%, more preferably from 0.1% to 5%, still more preferably from 1% to 3%, based on the total weight of the shaped article. When the content of the PTFE resin particles is less than 0.01% by weight, it is difficult to obtain the object of the present invention. Also, when the content of the PTFE resin particles is more than 10% by weight, the resultant shaped article exhibits unsatisfactory mechanical properties.

The shaped article of the present invention may contain usual additives, for example, dyes, pigments, carbon black, ceramic powder, and metallic powder.

In the shaped article of the present invention, the PTFE resin particles distributed in the form of fine fibril networks in the matrix have a high degree of orientation and a high degree of crystallization. This feature makes an important contribution to the excellent mechanical properties of the shaped article of the present invention.

The degrees of orientation and crystallinity of the PTFE resin particles in the shaped article of the present invention can be clearly recognized by a wide angle X-ray photograph thereof.

Figure 3:
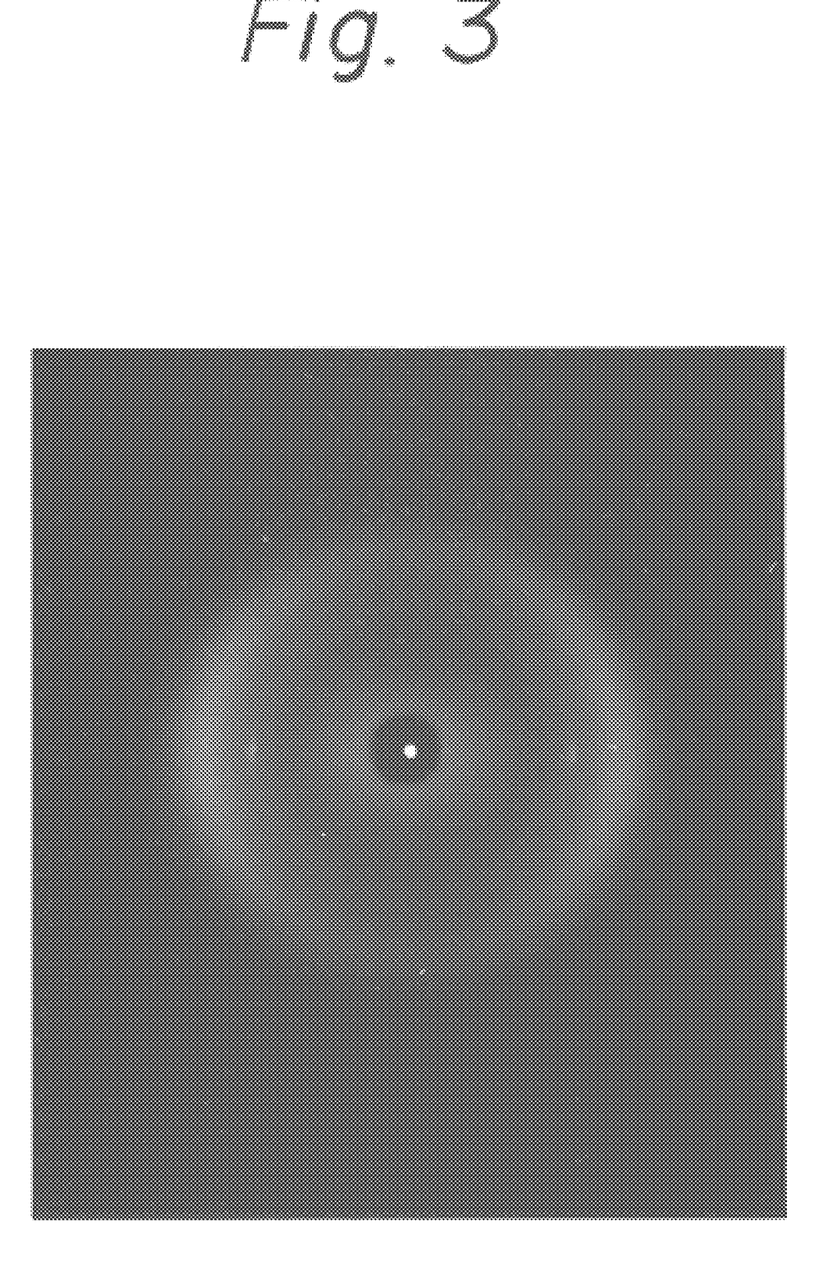
FIG. 3 shows a wide angle X-ray photographic view of an embodiment of the wholly aromatic polyamide resin composition usable for the present invention.

FIG. 3 shows a wide angle X-ray photograph of a monofilament of the present invention. In this photograph, two clear spots show a reflection of the X-rays at a (1.0.0) face of a PTFE crystal and proves that the PTFE resin particles in the shaped article of the present invention have high degrees of orientation and crystallinity.

In the process of the present invention, the PTFE resin particles have an average size of from 0.3 to 3 $\mu$m.

The aqueous dispersion of the PTFE resin particles is preferably a commercially available aqueous colloidal dispersion of the PTFE resin.

In the aqueous dispersion, the content of the PTFE resin particles is preferably in the range of from 0.1% to 20%, more preferably from 0.5% to 10%.

In the preparation of the aqueous mixture, for example, a commercial aqueous colloidal dispersion containing 60% by weight of a PTFE resin is diluted with water to prepare an aqueous dispersion containing a predetermined amount of the PTFE resin particles. The diluted aqueous dispersion is mixed with a predetermined amount of wholly aromatic polyamide resin particles, and the resultant aqueous mixture is dried in a dryer to provide the coated composite particles.

In the preparation of the aqueous mixture, the mixing weight ratio of the aqueous dispersion of the PTFE resin particles to the aromatic polyamide resin particles is preferably in the range of from 1:4 to 2:1. When the content of the aqueous dispersion is excessively small, it is difficult to evenly mix the aqueous dispersion with the aromatic polyamide resin particles. If the content of the aqueous dispersion is excessively large, the drying step takes an undesirably long time and sometimes results in an uneven mixing of the two components.

As stated hereinbefore, each of the aromatic polyamide resin particles is composed of a plurality of primary particles having an average size of from 0.1 to 2.0 $\mu$m and aggregated with each other and thus the resultant secondary particles have an average size of 30 to 200 $\mu$m, and are porous. Accordingly, in the aqueous mixture, the aqueous dispersion of the PTFE resin particles can easily penetrate the secondary porous aromatic polyamide resin particles and the PTFE resin particles can be deposited on the aromatic polyamide resin particles. In the drying step, the PTFE resin particles form coating layers on the aromatic polyamide resin core particles.

The shaping feed powder is prepared from the coated composite particles or a mixture of the coated composite particles and an additional amount of non-coated aromatic polyamide resin particles. The mixture may be an even mixture or an uneven mixture composed of a coated composition particle phase and a non-coated particle phase.

In the shaping step, the feed powder is continuously or discontinuously heat compressed in a mold and extruded through a shaping die. For example, in a discontinuous shaping method the feed powder is molded into a plate-like article in accordance with the method disclosed in Japanese Unexamined Patent Publication (Kokai) No. 61-293818, and then the plate-like article is converted to a desired shaped article by the extrusion method disclosed in Japanese Unexamined Patent Publication (Kokai) No. 61-245305.

In a continuous shaping method, a feed powder is shaped by a plunger type extrusion apparatus in which a heat-compression zone and a heat-extrusion zone are separately provided.

In all types of shaping methods, the coated composite particles of the present invention are very advantageous in that, since the aromatic polyamide resin particles are coated with the PTFE resin, the feed can smoothly flow through the shaping apparatus without a direct adherence of the aromatic polyamide resin to the inside wall surfaces of the shaping apparatus, and thus the shaping procedure can be continuously carried out for a long time without interruption.

In the shaped article of the present invention, the dispersoid optionally further contains a number of additional inorganic particles dispersed together with the PTFE resin particles in the matrix.

The additional inorganic particles usable for the present invention are preferably abrasive inorganic particles and selected from the group consisting of silica, silicon carbide, alumina, and diamond particles. The additional inorganic particles preferably have a size of from 10 mesh to 10,000 mesh.

In the shaped article containing the additional inorganic particles of the present invention, the PTFE resin particles form fine networks of fibrils and the additional inorganic particles are entangled with and firmly supported by the fine networks in the matrix. Therefore, even when the shaped article is immersed in a solvent for the matrix, the additional inorganic particles are kept by the PTFE resin fine networks and not separated from the shaped article into the solvent.

In the shaped article of the present invention, there is no specific limitation to the content of the additional inorganic particles but usually, the content of the additional inorganic particles is from 1 to 50% based on the total weight of the shaped article, based on the use of the shaped article.

Figure 5:
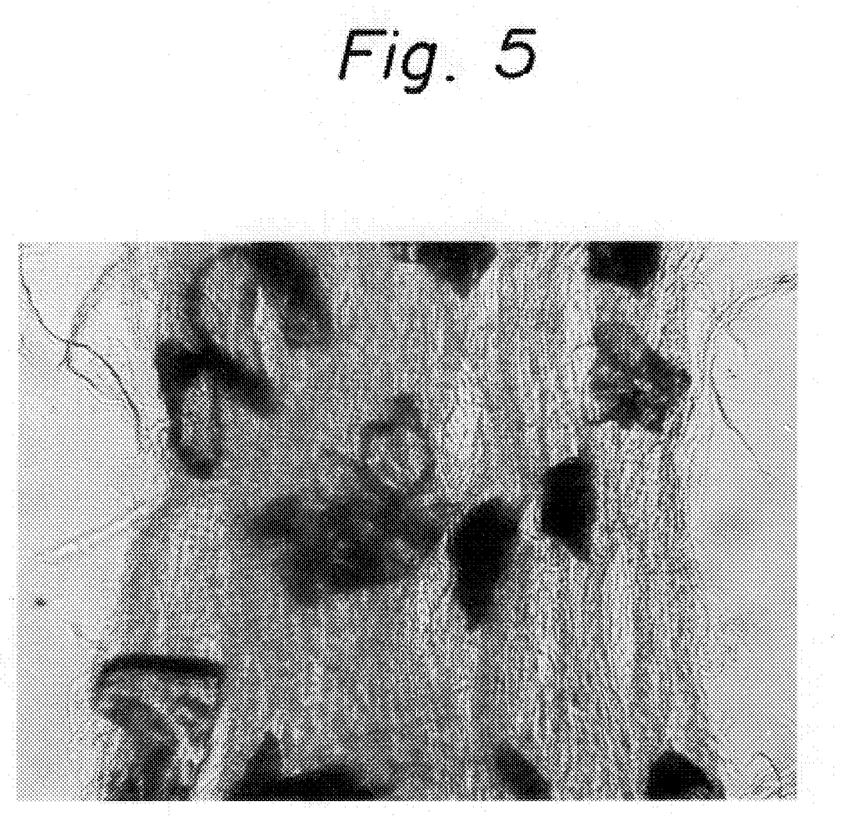
FIG. 5 shows a microscopic view of another embodiment of the shaped article of the present invention in which a number of additional inorganic particles are dispersed together with the polytetrafluoroethylene resin fibril-like particles in the matrix.

A microscopic view of a dispersoid consisting of the PTFE resin particles and the additional inorganic particles dispersed in a matrix of the shaped article is shown in FIG. 5.

In the preparation of a specimen for microscopic observation, a monofilament of the present invention comprising a dispersoid consisting of the PTFE resin particles in a content of 1.0% by weight and additional inorganic particles consisting of silicon carbide (#1500) and in a content of 10% by weight, and a matrix consisting of a PMIA resin was immersed in a solvent consisting of N-methylpyrrolidone, to remove the matrix, and a non-dissolved white fiber-like fraction was separated from the solvent and subjected to microscopic observation at a magnification of 200 in the same manner as mentioned above.

FIG. 5 is the resultant microscopic photograph and shows that the additional inorganic particles are entangled with the PTFE resin fine networks.

In the shaped article of the present invention, the dispersoid consisting of the PTFE resin particles and the additional inorganic particles may be evenly distributed throughout the shaped article or locally distributed in specific portions of the shaped article. Alternately, the distribution density of the dispersoid may be changed at a predetermined pattern.

Figure 6:
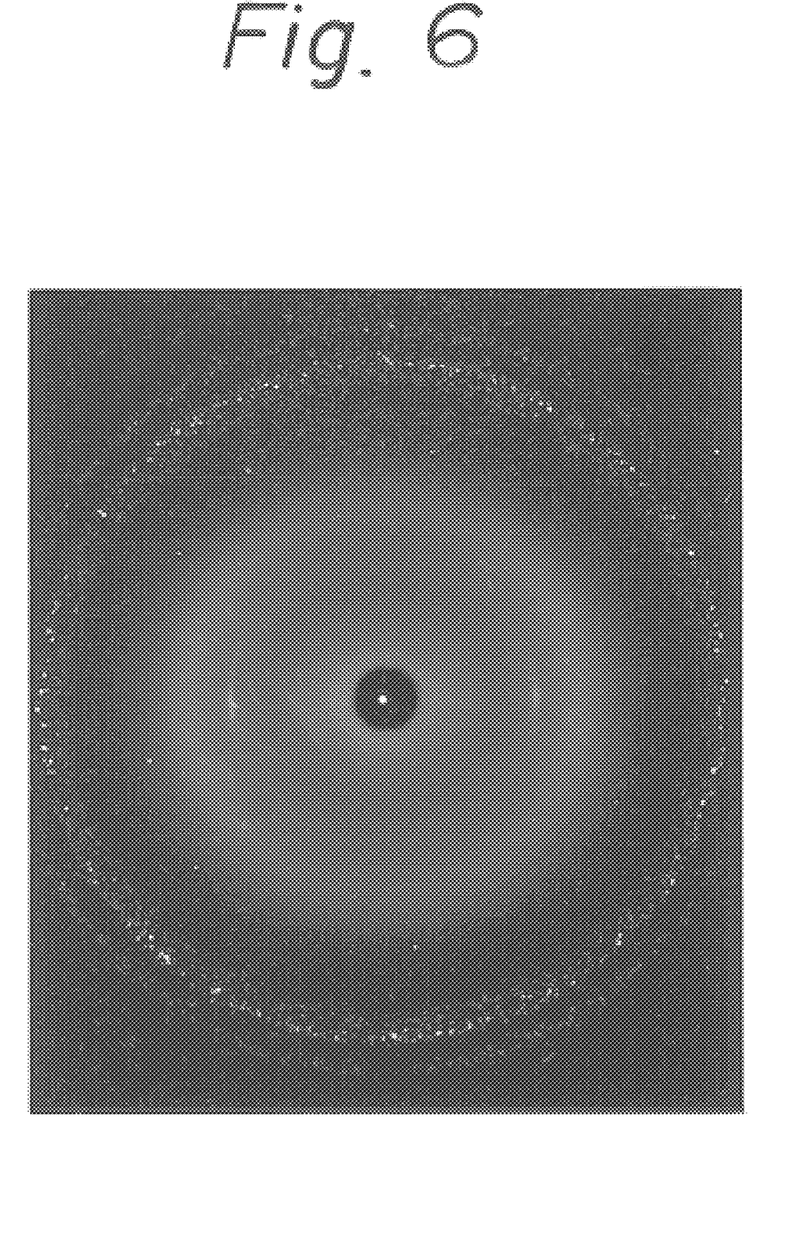
FIG. 6 shows a wide angle X-ray photographic view of another embodiment of the wholly aromatic polyamide resin composition containing the additional inorganic particles and usable for the present invention; and, FIG. 7 shows an explanatory cross-section of another embodiment of the apparatus for producing the shaped article of the present invention.

FIG. 6 shows a wide angle X-ray photograph of the above-mentioned monofilament of the present invention. In FIG. 6, two spots on the equator line show a reflection of X-ray on the (1,0,0) face of a PTFE crystal and a ring composed of a large number of spots show a reflection of X-rays on a silicon carbide particle (#1500) dispersed in the PMIA resin matrix.

The shaped article containing the additional inorganic particles is produced by mixing an aqueous dispersion of fine PTFE particles with additional inorganic particles and aromatic polyamide resin particles and drying the resultant aqueous mixture to provide a mixture of coated composite particles composed of cores consisting of the aromatic polyamide resin particles (secondary particles) and thin coating membranes consisting of the PTFE resin particles and additional coated composite particles composed of cores consisting of the additional inorganic particles and thin coating membranes consisting of the PTFE resin particles and the aromatic polyamide resin particles, by preparing a shaping feed powder comprising at least the dried mixture of the coated composite particles and the additional coated composite particles and, optionally, an additional amount of the aromatic polyamide resin particles, and then subjecting the shaping feed powder to a shaping procedure in the same manner as mentioned hereinbefore.

In the mixing step, the sum of the aromatic polyamide resin particles and the additional inorganic particles preferably has a weight ratio to the aqueous dispersion of the PTFE resin particles of from 1:4 to 2:1. Also, in the mixing step, the additional inorganic particles are used in an amount of 1% to 50% based on the total weight of the shaped article.

Figure 4:
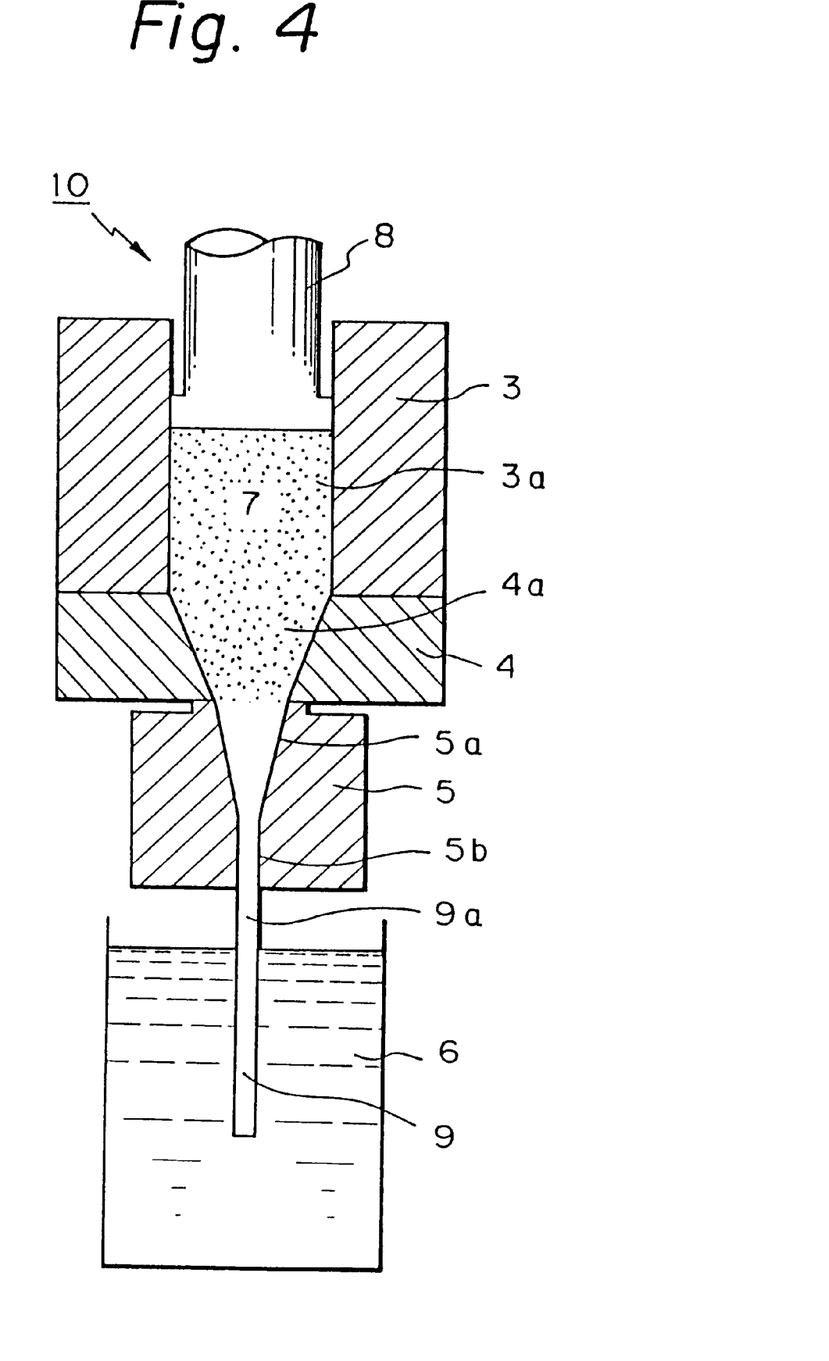
FIG. 4 is an explanatory cross-sectional view of an embodiment of the apparatus for producing the shaped article of the present invention.

The shaping procedure in the process of the present invention can be carried out, for example, by the compression molding apparatus shown in FIG. 4.

Referring to FIG. 4, the compression molding apparatus 10 is used for producing a rod and comprises a preheating cylinder 3 having a cylindrical hollow zone 3a formed therein, a heating cylinder 4 connected to the preheating cylinder 3 and having a cone-shaped hollow zone 4a formed therein and connected to the cylindrical hollow zone 3a, an extrusion die 5 connected to the heating cylinder 4 and having a cone-shaped upper hollow zone 5a connected to the cone-shaped hollow zone 4a and a cylindrical lower hollow zone 5b having a predetermined diameter and connected to the cone-shaped upper hollow zone 5a, a cooling bath 6 located downstream from the extrusion die 5, and a plunger 8 inserted into the cylindrical hollow zone 3a and connected to a motor (not shown in the drawing).

In the production of a rod by the apparatus shown in FIG. 4, a shaping feed powder 7 is fed into the cylindrical hollow zone 3a in the preheating cylinder 3 and the cone-shaped hollow zone 4a in the heating cylinder 4, and compressed by moving the plunger 8 downward.

The shaping feed powder 7 in the cylindrical hollow zone 3a is preheated by the preheating cylinder at a temperature of, for example, about 260° C., which is slightly lower than the glass transition temperature of the aromatic polyamide resin, for example, about 280° C. The preheated feed powder is fed into the cone-shaped hollow zone 4a and heated by the heating cylinder 4 at a temperature not lower than the glass transition temperature of the aromatic polyamide resin, preferably 30° C. to 70° C. higher than the glass transition temperature, i.e., about 310° C. to about 350° C. The heated feed is fed into the upper hollow zone 5a and then into the lower hollow zone 5b and preferably heated at a temperature of 20° C. to 80° C. lower than the melting point (for example, about 430° C.) of the aromatic polyamide resin.

The heated feed is extruded under a compressive pressure through the extrusion die 5. The extruded rod 9a having a predetermined diameter is introduced into a cooling bath 6 and cooled therein by a cooling medium, for example, water, to provide a cooled rod 9.

While being fed through the cylindrical hollow zone 3a and the cone-shaped hollow zone 4a, the feed powder 7 is compressed by the plunger 8 and air introduced together with the feed powder 7 into the hollow zones is discharged through a ventilating means (not shown in the drawing). Upon reaching the hollow zones 5a and 5b, the feed powder 7 has a packing of 100% and is substantially free from air bubbles.

To most effectively compress the feed powder 7, the friction resistance of the feed powder 7 to the inside wall surfaces of the molding apparatus must be kept as low as possible. In the feed powder 7 of the present invention, the coated composite particles and the additional composite particles have coating membranes consisting of the PTFE resin particles, and thus exhibit a very low friction resistance to the inside wall surface of the apparatus.

In the compression molding procedure in the process of the present invention, the coated composite particles and the additional coated composite particles have the following advantages.

In the composite particles and the additional composite particles, the coating membranes are easily dissociated and converted to individual PTFE resin fine particles by immersing the particles in water. Nevertheless, in the compression molding procedure in which the composite particles and the additional composite particles are heat-compressed and extruded through a extrusion die at a high temperature of about 310° C. to 350° C. under a high pressure, the PTFE resin particles, which have a melting point of about 330° C., are softened and deformed into fine fibrils and the fibrils are connected to adjacent fibrils to form fine networks. The PTFE particles in the form of fine networks of fibrils are very stable and are not separated from each other even when the shaped article is immersed in water or other solvent.

To increase the mechanical strength of the shaped article, preferably the shaped article is drawn at a temperature close to the glass transition point of the aromatic polyamide resin. This drawing procedure gives the aromatic polyamide resin matrix an enhanced degree of orientation, and thus the shaped article has an increased mechanical strength. Also, the drawing procedure imparts a large shearing force to the PTFE particles so that the PTFE resin particles in the form of fine fibrils are drawn and the degrees of orientation and crystallinity of the PTFE resin fibrils are increased. This phenomenon also contributes to the enhancement of the mechanical properties of the shaped article of the present invention.

Figure 7:
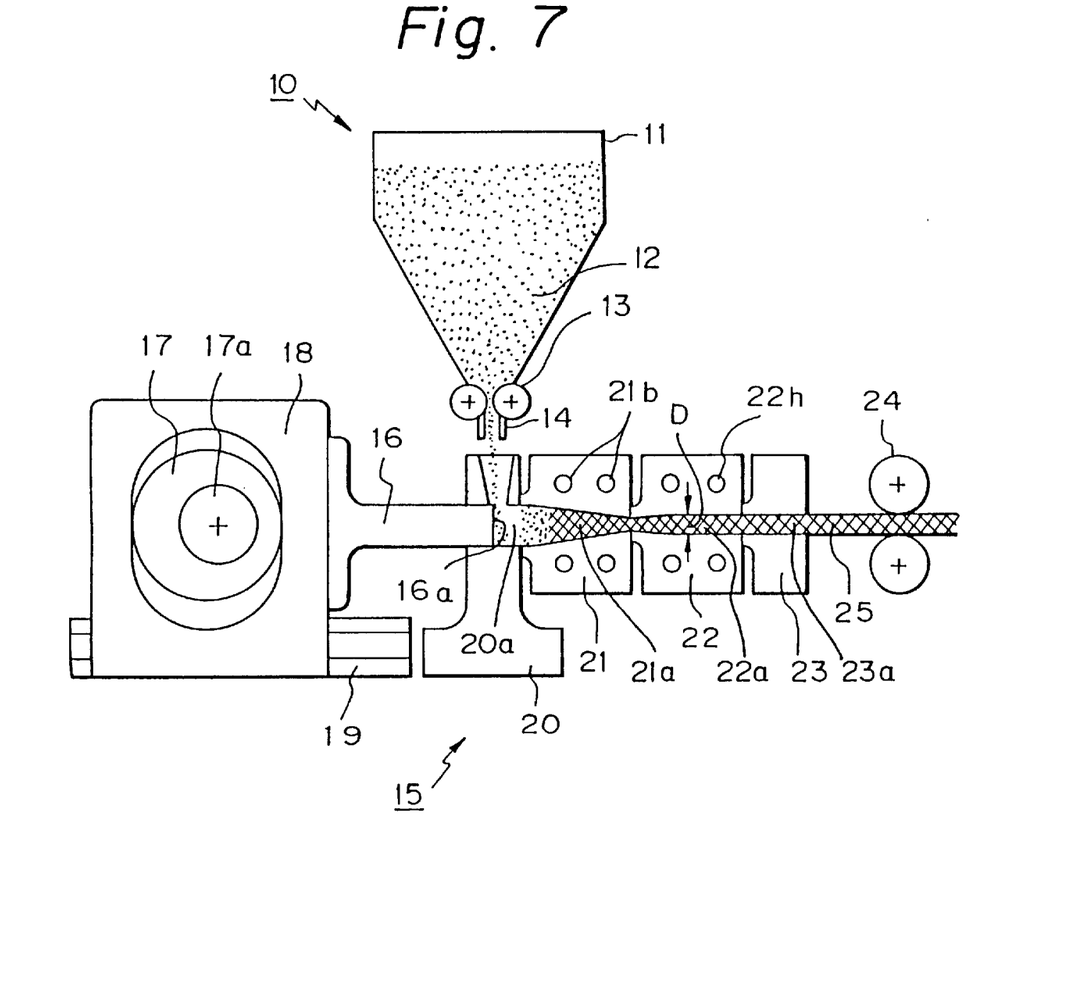

In another example of the process of the present invention, the heat-compressing and shaping procedures can be carried out by using the apparatus shown in FIG. 7.

Referring to FIG. 7, the apparatus 10 comprises a hopper 11 for feeding a shaping feed powder 12, equipped with a pair of feed rolls 13 for controlling the feed rate of the feeding powder 12, arranged at the lower end opening 14 of the hopper 11, and a shaping machine 15 located downstream from the hopper 11.

The shaping machine 15 comprises a plunger 16 which is connected to a motor (not shown in FIG. 7) through an eccentric cam 17 which rotates eccentrically around a shaft 17a and is supported by a frame 18 which is reciprocally movable along a horizontal rail 19 by means of an air pressure cylinder, oil pressure cylinder or other mechanical reciprocating mechanism (not shown in FIG. 7).

A vertical stand 20 located below the feed end 14 of the hopper 11 has an L-shaped room 20a for receiving the feed powder 12 fed from the hopper 12. A working end 16a is inserted into a lower portion of the room 20a.

The vertical stand 20 is connected to a heat-compression member 21 having a tunnel-shaped heat-compression room 21a formed therein and connected to the receiving room 20a in the vertical stand 20. The heat-compression member 21 is provided with heaters 21b.

In the heat-compression room 21a, the vertical cross-sectional area thereof is gradually decreased in a direction of from the feeding end to the delivery end thereof.

The heat-compression member 21 is connected to a shaping or molding member 22 having a tunnel-shaped molding room 22a formed therein and connected to the heat-compression room 21a of the heat-compression member 21. The molding member 22 is provided with heater 22h.

The molding member 22 is connected to a cool-extruding die 23 having a tunnel shaped extruding passage 23a formed therein and connected to the molding room 22a.

A pair of delivery rolls 24 are arranged downstream of the cool-extruding die 23.

In the apparatus shown in FIG. 7, the shaping feed powder 12 is fed from the hopper 11 through the feed rolls 13 and the lower end opening 14 into the feed receiving room 20a at a predetermined feeding rate.

When the plunger 16 is horizontally reciprocated, the feed powder 12a in the room 20a is intermittently fed to the heat-compression room 21a and heat compressed therein. The plunger 16 preferably moves at a reciprocating rate of 0.5 to 300 cycles/min. When the reciprocating rate is less than 0.5 cycles/min, the amount of the feed powder to be compressed by each compression operation becomes too high, and thus the feed powder is sometimes unevenly compressed and the resultant shaped article exhibits an uneven density. If the feeding rate is reduced, to prevent the uneven compression, this results in a lowered productivity of the shaped article, and thus the object of the present invention cannot be attained.

If the reciprocating rate is more than 300 cycles/min, ventilation of the compressed feed powder becomes difficult, the energy loss in the compression procedure becomes large, and too great a load must be applied to the compression apparatus.

Accordingly, more preferably the reciprocating rate of the plunger is from 2 to 30 cycles/min.

Usually, the plunger is preferably operated under a compression capacity of at least 100 kgf/cm$^2$, more preferably, at least 500 kgf/cm$^2$.

The feed powder 2 is intermittently introduced into and heat-compressed in the heat-compression room 21a by the reciprocating plunger 16. In this operation, the control of the heat-compression temperature and the compression ratio at predetermined levels thereof is important.

The compression ratio in the heat-compression room 21a is defined as a ratio Si/So in which Si represents an area of the feeding end opening of the room 21a and So represents an area of the delivery end opening of the room 21a.

Preferably, the compression ratio Si/So in the heat-compression room 21a is from 1.1 to 100, more preferably from 2 to 10. When the compression ratio is less than 1.1, complete ventilation of the feed powder in the heat-compression room 21a becomes difficult. If the compression ratio is more than 100, the load applied to the plunger 16 becomes too large and it becomes difficult to smoothly mold the feed powder.

The feed powder 2 in the heat-compression room 21a is heated by the heaters 21b at a constant temperature of from the glass transition temperature of the aromatic polyamide resin to about 80° C. higher than the glass transition temperature, usually from about 280° C. to 360° C.

When the temperature is lower than the glass transition temperature, the aromatic polyamide resin matrix is not softened, and thus it becomes difficult to compress the feed powder at a high compression ratio and to produce a shaped article having a high density.

When the temperature is higher than 80° C. higher than the glass transition temperature, sometimes the feed powder adheres to the inside wall surface of the heat-compression room 21. This phenomenon makes a uniform compression of the feed powder difficult, and the resultant shaped article has an uneven quality. Also, the excessively high heat compression temperature reduces the inherent viscosity of the aromatic polyamide resin, and thus the resultant shaped article exhibits deteriorated properties.

Preferably, the heat-compression temperature is controlled to a level of from 20° C. to 60° C. higher than the glass transition temperature of the aromatic polyamide resin, at which temperature the aromatic polyamide resin particles and the PTFE resin particles are softened and firmly bonded to each other to an appropriate extent.

The heat-compressed and softened feed having a packing of about 100% exhibits a thermoplasticity similar to that of usual thermoplastic resins.

Air or water vapor discharged from the feed powder in the heat compression room 21a flows back to the room 20a and is discharged through the upper feed end opening of the room 20a when the plunger 16 is moved backward.

The thermoplastic feed is introduced from the heat-compression room 21a into the molding room 22a having a predetermined cross-sectional profile and dimensions, and is fed therethrough under pressure to a shaped article having predetermined shape and dimensions, while heating it at a predetermined molding temperature by the heater 22b. In FIG. 7, the shaped article is a thick plate having a thickness D. The molding temperature is preferably similar to or slightly higher than the heat-compression temperature.

The resultant shaped article is cooled and extruded through the cool-extruding die 23 at a temperature lower than the glass transition temperature of the aromatic polyamide resin. If the extruding temperature is higher than the glass transition temperature, the extruded article is easily deformed at the delivery end of the die and it becomes difficult to obtain shaped articles having a uniform quality.

The cooled shaped article 25 is delivered by a pair of delivery rolls 24. The delivery speed of the rolls 25 is controlled so that the compression pressure to be applied to the feed powder by the plunger is controlled to a suitable level, the molding procedure is stabilized, and the quality of the resultant shaped article is made uniform.

The shaped article of the present invention has the following advantages.

(1) The surface of the shaped article is not adhesive and has a stain-proof property.

(2) The surface of the shaped article exhibits very low frictional characteristics.

(3) The surface of the shaped article is antistatic.

(4) The shaped article has an enhanced resistance to chemicals.

(5) The shaped article exhibits an increased flexural fatigue resistance and impact strength.

The advantageous properties (1) and (2) are expected from the composition of the shaped article of the present invention, but the above-mentioned advantageous properties (3), (4) and (5) are unexpected and surprising effects of the present invention. The reasons for these unexpected effects are not completely clear, but it is assumed that the antistatic property of the shaped article of the present invention is derived because the positions of the aromatic polyamide resin and the PTFE resin in the triboelectric series are substantially opposite to each other, and thus the static charge on the aromatic polyamide resin matrix is neutralized by the static charge on the PTFE resin fibrils distributed in the matrix.

Also, it is assumed that the high chemical resistance of the shaped article of the present invention is derived because the aromatic polyamide resin matrix covered and protected by the fine networks of the PTFE resin fibrils.

Further, it is assumed that the high flexural fatigue resistance of the shaped article of the present invention is derived because the aromatic polyamide resin matrix is reinforced by the fine networks of the PTFE resin fibrils having increased degrees of orientation and crystallinity.

The shaped article containing the additional inorganic particles of the present invention has the following advantages.

(1) The shaped article exhibits an enhanced flexural fatigue resistance even where the additional inorganic particles are distributed in the entire surface portion of the article, because the additional inorganic particles are entangled by the fine networks of the PTFE resin fibrils and the aromatic polyamide resin matrix is reinforced by the fine networks. Accordingly, it becomes possible in accordance with the present invention to provide hard fibers having a circular cross-sectional profile and containing the additional inorganic particles distributed in the entire surfaces portion of the hard fibers.

(2) The shaped article exhibits an enhanced resistance to wear and impact strength, because the additional inorganic particles are firmly fixed and the aromatic polyamide resin matrix is reinforced by the fine networks of the PTFE resin fibrils.

(3) The shaped article has an enhanced antistatic property, chemical resistance and stain-proof property, and a low adhesive property, as mentioned above.

The process of the present invention has the following advantages.

(1) The combinations of the PTFE resin particles with the aromatic polyamide resin particles and with the additional inorganic particles are very stable, and thus the handling of the feed powder for the shaping procedure is easy.

(2) The feed powder has substantially no adherence to the inside wall surface of the shaping apparatus including a shaping die.

(3) Since the surfaces of the additional inorganic particles are coated with coating membranes consisting of the PTFE resin particles, the inside wall surface of the shaping apparatus does not come into direct contact with the additional inorganic particles, to cause scratching.

The process of the present invention using the apparatus shown in FIG. 7 has the following advantages.

(1) It is now possible for the first time to produce a long and/or thick shaped article, impossible to produce by the prior compression molding processes, from the aromatic polyamide resin.

(2) Since the shaped article can be automatically and continuously produced, the production cost of the shaped article is significantly reduced.

(3) The resultant shaped article has a uniform quality.

EXAMPLES

The following examples illustrate the present invention in more detail and in no way restrict the scope of the present invention.

Example 1

(1) Preparation of coated composite particles In accordance with the interfacial polycondensation method disclosed in Japanese Examined Patent Publication (Kokoku) No. 47-10863, fine poly-m-phenyleneisophthalamide (PMIA) resin particles having a melting point of 415° C. and an average secondary particle size of 70 $\mu$m were produced.

The PMIA resin particles in an amount of 100 parts by weight were evenly mixed with 150 parts by weight of an aqueous dispersion of 4% by weight of PTFE resin fine particles having a melting point of 325° C. and an average size of 1 $\mu$m in a V-type mixer, for 30 minutes.

The resultant aqueous mixture was dried in a dryer to completely remove water from the mixture.

Coated composite particles were obtained.

(2) Shaping a shaping feed powder into a rod having a diameter of 5 mm

A shaping feed powder consisting of the above-mentioned coated composite particles was subjected to a compression molding process by the apparatus shown in FIG. 4.

The apparatus had a cylindrical hollow zone 3a having a diameter of 50 mm, a cone-shaped hollow zone 4a having a lower end diameter of 20 mm, a cone-shaped upper hollow zone 5a, and a cylindrical lower hollow zone 5b having a diameter of 5 mm.

The feed powder was fed into the cylindrical hollow zone 3a and heat-compressed by moving a plunger 8 forward to the lower end of the cylindrical hollow zone 3a.

The feed powder was preheated in the cylindrical hollow zone 3a at a temperature of 260° C., and introduced into and heated in the cone-shaped hollow zone 4a at a temperature of 340° C. while under compression.

The heat-compressed feed was further fed into the cylindrical lower hollow zone 5b through the cone-shaped upper hollow zone 5a in the extruding die 5. In the extruding die 5, the feed was heated at a temperature of 370° C. and then extruded through the lower end opening of the die 5.

The extruded shaped article 9a in the form of a rod was introduced into a cooling medium in the cooling bath 6.

A rod 9 was obtained. When the plunger 8 reached the lower end of the cylindrical hollow zone 3a, the compression operation ended and the plunger 8 was lifted, the next feed powder was fed into the cylindrical hollow zone 3a and the same procedures as mentioned above were repeated.

In the shaping procedures, it was confirmed that no adhesion of the feed powder to the inside wall surface of the apparatus occurred, and the compression-molding procedures were smoothly carried out without difficulty.

A portion of the resultant rod was subjected to microscopic observation in the same manner as described above, in which dimethylacetamide was used as a solvent for the PMIA resin, and it was confirmed that the PTFE resin fibrils form a fine continuous network structure which was like a blood capillary network structure of the organism.

The above-mentioned procedures were repeated many times without difficulty and all of the resultant rods had the same smooth surface and quality.

Comparative Example 1

The same procedures as described in Example 1 were carried out except that PTFE resin was not used.

The first molding operation was carried out without difficulty, but the resultant rod had a remarkably roughened surface.

In the second molding operation, it was found that a portion of the aromatic polyamide resin adhered to and remained on the inside wall surfaces of the cone-shaped hollow zone 4a, cone-shaped upper hollow zone 5a and cylindrical hollow zone 5b, and thus the molding operation could not be carried out.

Comparative Example 2

The same procedures as mentioned in Example 1 were carried out except that the shaping feed powder was prepared by dry mixing 100 parts by weight of the PMIA resin particles with 6 parts by weight of fine PTFE resin particles available under the trademark of POLYFLON MOLDING POWDER M-12, a fine polytetrafluoroethylene powder. made by the Daikin Kogyo Co., and had an average size of 25 μm, in a V type mixer for 30 minutes.

The surface of the resultant rod had less smoothness than obtained in Example 1.

Also, when the resultant rod was immersed in a solvent consisting of dimethylacetamide, the non-dissolved fraction comprised short fibrils, scale-shaped particles and other complex-shape particles which were separated from each other. It was confirmed by infrared ray analysis that the non-dissolved fibrils and particles consisted of the PTFE resin.

In the first molding operation, it was found that a small amount of the PMIA resin adhered to the inside wall surface of the apparatus. The amount of the adhered PMIA resin was in the first operation smaller than that in Comparative Example 1. When the molding operation was repeated, the amount of the adhered PMIA resin increased, and thus the processability of the molding operation was reduced.

Examples 2 to 6 and Comparative Example 3

In each of the examples and comparative example, a monofilament having a denier of 1200 was produced in the following manner.

(1) Preparation of shaping feed powder

An aqueous dispersion containing PTFE fine particles having a melting point of 325° C. and an average size of 1 μm and in an amount of 0, 0.5, 1, 3, 5 or 10% by weight was mixed with the same PMIA resin particles as mentioned in Example 1 at a mixing weight ratio of 1:1. The resultant aqueous mixture was dried to provide a shaping feed powder.

(2) Production of bristles

Using the apparatus disclosed in Japanese Unexamined Patent Publication (Kokai) No. 61-293818, the shaping feed powder was heat-compressed at a temperature of 320° C. under a pressure of 50 kgf/cm² to form a plate-shaped article having a thickness of 8 mm.

In the heat-compression procedure, it was surprisingly found that the shaping feed powder could be compressed to a packing of 100% under the above-mentioned low pressure, without adding water to the powder. The reasons for this phenomenon were assumed to be that the PTTE resin particles were distributed among the PMIA resin particles and contributed to a reduction of the internal friction between the MMIA resin particles in the shaped article.

The plate-shaped article was converted to bristles in accordance with the method disclosed in U.S. Pat. No. 4,751,760 (FIG. 10), as follows.

The plate-shaped article was preheated at a temperature of 255° C. in a preheating zone, and then heated and softened at a temperature of 350° C. in a softening zone. The softened article was extruded through a plurality of orifices at the above-mentioned temperature. The resultant rod-shaped articles were introduced into a warming zone at a temperature of 340° C. and first drawn in this zone at a draw ratio of 10. The resultant first drawn bristles was second drawn on a heat drawing plate at a temperature of 280° C. at a draw ratio of 3 to provide drawn bristles having a denier of 1200.

In Comparative Example 3, PTFE resin was not mixed with the PMIA resin.

The comparative shaping feed powder of Comparative Example 3 provided an unsatisfactory molding processability, surface smoothness, and flexural fatigue resistance of the resultant monofilament, whereas the above-mentioned features of the shaping feed powders of Examples 2 to 6 were satisfactory.

The bristles of Examples 2 to 6 and Comparative Example 3 exhibited the tensile strengths and static electricity-generating potentials shown in Table 1.

TABLE 1

| | Example No. | | | | | |
| --- | --- | --- | --- | --- | --- | --- |
| | Example | | | | | Comparative |
| Item | 2 | 3 | 4 | 5 | 6 | Example 3 |
| PTFE content (wt %) | 0.5 | 1.0 | 2.9 | 4.8 | 9.1 | 0 |
| Tensile strength (g/d) | 2.9 | 3.0 | 3.2 | 2.8 | 2.4 | 2.7 |
| Static electricity-generating potential (KV) | 1.8 | 1.0 | 0.7 | 0.5 | 0.5 | 2.9 |

From the above-mentioned examples, it was recognized that the shaping feed powder of Example 4 containing 2.9% by weight of the PTFE resin particles was most preferable in view of the molding processability, surface smoothness, flexural fatigue resistance tensile strength, and anti-static property of the resultant monofilament.

A portion of each of the monofilaments of Examples 2 to 6 was immersed in a solvent consisting of N,N'-dimethylformamide, to provide a non-dissolved fraction thereof.

In the microscopic observation, it was confirmed that the non-dissolved fraction was composed of a number of fine networks of the PTFE resin fibrils.

Also, by a wide angle X-ray analysis, it was confirmed that the PTFE resin fibrils in the non-dissolved fraction had high degrees of orientation and crystallinity, similar to those shown in FIG. 3.

Example 7

The same procedures for producing a plate-shaped article as in Example 4 were carried out, except that the plate-shaped article was composed of upper and lower layers each formed from 30 parts by weight of the same shaping feed powder as in Example 4, and an intermediate layer formed between the upper and lower layers and prepared from the same PMIA resin particles as in Examples 2 to 6.

The composite plate-shaped article was converted to a film having a thickness of 0.3 mm in accordance with the method mentioned in U.S. Pat. No. 4,751,760 and by using the apparatus indicated in FIG. 5 thereof and having an extruding slit having a thickness of 1 mm, under the same conditions as described in Examples 2 to 6.

The resultant composite film was further drawn in the transverse direction at a draw ratio of 1.5.

When a portion of the composite film was immersed in a solvent consisting of dimethyl acetamide, it was confirmed by microscopic observation that the resultant non-dissolved fraction was composed of a number of fine networks of the PTFE resin fibrils.

Example 8

A rod consisting of an aromatic polyamide resin composition was produced by the following procedures.

(1) Preparation of shaping feed powder

Poly-m-phenyleneisophthalamide (PMIA) resin porous particles having a melting point of 420° C. and an average secondary particle size of 70 μm were prepared by the interfacial polycondensation method disclosed in Japanese Examined Patent Publication (Kokai) No. 47-10863.

The PMIA resin particles in an amount of 70 parts by weight were mixed with 30 parts by weight of silicon carbide (SiC) particles having a 240 mesh size (80 μm) in a V-type mixer for 30 minutes, and then with 100 parts by weight of an aqueous dispersion containing 2% by weight of the same PTFE resin fine particles as mentioned in Example 1 in the V-type mixer for 30 minutes.

The resultant aqueous mixture was dried in a dryer to provide a shaping feed powder containing substantially no water.

(2) Production of rod

The shaping feed powder containing the silicon carbide particles was converted to a rod having a diameter of about 5 mm by the same procedures as described in Example 1.

It was confirmed that, even if the shaping (molding) procedures are repeated many times, no adhesion of resinous material to the inside wall surface of the molding apparatus occurred, and all of the resultant rods had a very smooth surface.

When a portion of the rod was immersed in a solvent consisting of dimethyl acetamide to remove the PMIA resin, and the non-dissolved fraction was observed by a microscope, it was confirmed that the PTFE resin particles in the form of fibrils form fine networks and the silicon carbide particles were entangled with the fine networks.

Comparative Example 4

The same procedures as described in Example 8 were carried out except that no PTFE resin was used.

It was found that the molding procedures could not be carried out because the PMIA resin was adhered to the inside wall surfaces of the heat-compression zone and the extrusion zone of the molding apparatus.

Comparative Example 5

The same procedures as described in Example 8 were carried out except that the shaping feed powder was prepared by dry mixing 30 parts by weight of the silicon carbide particles with 70 parts by weight of the PMIA resin particles and 6 parts by weight of the same PTFE resin particles as described in Comparative Example 2.

In the first molding operation, the amount of the PMIA resin adhered to the inside wall surfaces in the molding apparatus was smaller than that in Comparative Example 4, and thus the first molding operation could be completed.

Nevertheless, the molding operation could not be repeated because of an increased adhesion of the PMIA resin to the inside wall surfaces in the molding apparatus.

When a non-dissolved fraction was separated from the resultant rod by a solvent, it was found that the non-dissolved fraction was composed of a number of PTFE resin particles which were in the various forms of short fibrils, scales and other complex-shape particles and silicon carbide particles which were separate from the PTFE resin particles. Also, it was found that the silicon carbide particles were not entangled with the PTFE resin fibrils.

Examples 9 to 13 and Comparative Example 6

In each of the examples and the comparative example, bristles containing silicon carbide particles and having a denier of 600 and a circular cross-sectional profile, were produced by the following procedures.

(1) Preparation of shaping feed powder

A shaping feed powder was prepared by mixing 50 parts by weight of an aqueous dispersion containing 0, 1, 2, 6, 10 or 20% by weight of the PTFE resin particles as described in Example 1 with 10 parts of silicon carbide particles having a 500 mesh size and 90 parts by weight of the same PMIA resin particles as described in Example 8, and by drying the resultant aqueous mixture.

(2) Production of bristles

The shaping feed powder was converted to a plate-shaped article having a thickness of 8 mm by the same method and apparatus as described in Examples 2 to 6.

The plate-shaped article was converted to bristles having a denier of 600 and a circular cross-sectional profile by the same method and apparatus as described in Examples 2 to 6, except that the drawn monofilament was again drawn on the drawing plate at a temperature of 280° C. and a draw ratio of 2.5.

It was confirmed that, in the resultant bristles of Examples 9 to 13, the PTFE resin particles were in the form of fine networks of fibrils and the silicon carbide particles were entangled with the fine networks of the PTFE resin fibrils.

Also, the bristles of Examples 9 to 10 exhibited wide angle X-ray photographs similar to that shown in FIG. 6. The photographs indicate that the PTFE particles (fibrils) in the monofilaments had high degrees of orientation and crystallinity.

The shaping feed powders of Examples 9 to 13 had a satisfactory in filament-forming processability, whereas the molding processability of the shaping feed powder of Comparative Example 6 was unsatisfactory.

(3) Production of brush

Each bristle was used to produce an abrasive brush.

The brushes of Examples 9 to 13 exhibited an excellent stain-proof property, whereas the comparative brush had an unsatisfactory stain-proof property.

The stain proof property was evaluated by rotating a brush fixed on a rotating shaft at a rotation number of 1200 rpm while bringing the brush into contact with a ceramic plate for 30 hours or with a steel plate (SS-41) for 30 minutes and then by observing the stain on the bristles.

The brushes of Examples 9 to 12 exhibited a satisfactory abrasive property, whereas the abrasive property of the comparative brush was unsatisfactory.

The abrasive property was evaluated by rotating a brush fixed on a rotating shaft at a rotation number of 1200 rpm while bringing a steel plate (SS-41) into contact with the brush for 30 minutes, and by observing the abrasive degree of the bristles.

Each of the brushes of Examples 9 to 13 and comparative Example 6 was subjected to a bristle-breakage test and a static-electricity-generating potential test.

The results are shown in Table 2.

The bristle-breakage test was carried out by rotating a brush fixed on a rotating shaft at a rotation number of 1200 rpm for 30 hours while bringing a ceramic plate into contact with the brush and counting the number of broken bristles.

The static electricity-generating potential test was carried out by rotating a brush fixed on a rotating shaft at a rotation number of 1800 rpm while bringing a steel plate (SS-41) into contact with the brush, and measuring the potential of the bristles of the brush by using a current-collector type potential tester.

TABLE 2

| Item | Example No. | | | | | |
|---|---|---|---|---|---|---|
| | Example | | | | | Comparative |
| | 9 | 10 | 11 | 12 | 13 | Example 6 |
| Content of PTFE (wt %) | 0.5 | 1.0 | 2.9 | 4.8 | 9.1 | 0 |
| Hard fiber breakage number | 24 | 9 | 4 | 13 | 19 | 312 |
| Static electricity-generating potential (KV) | 1.5 | 1.0 | 0.7 | 0.5 | 0.5 | 3.1 |

In view of Table 2, preferably the content of the PTFE resin particles is in the range of from about 1.0 to about 5% by weight.

Example 14

A composite film was produced by the same procedures as those described in Example 7, except that the composite plate-shaped article was composed of upper and lower layers each formed from 30 parts by weight of the same shaping feed powder in Example 11 and an intermediate layer formed between the upper and lower layers and formed from 40 parts by weight of the same PMIA resin particles as in Examples 9 to 13.

It was confirmed by the microscopic observation that a non-dissolved fraction of the film in dimethylacetamide was composed of fine networks of PTFE resin fibrils and the silicon carbide particles were entangled by the fine networks.

When used as an emery paper, the composite film of the present example exhibited not only a higher thermal resistance but also a higher resistance to separation of the abrasive particles and a higher resistance to wear than those of a conventional emery paper.

The durability of the composite film to abrasion was about ten times that of the conventional emery paper.

Example 15

A plate-shaped article was produced by using the molding apparatus indicated in FIG. 7, by the following procedures.

(1) Preparation of shaping feed powder

The same PMIA resin particles as mentioned in Example 1 were mixed in an amount of 100 parts by weight with 100 parts by weight of an aqueous dispersion of 1% by weight of the same PTFE resin particles as mentioned in Example 1, in an omni mixer. The resultant aqueous mixture was dried to provide a shaping feed powder.

The PMIA resin had a glass transition temperature of 277° C., which was determined from a DSC curve measured by a different scanning calorimeter available under the trademark THERMOFLEX DSC-8230, and made by Rigaku Denki K.K., in which 2 mg of the PMIA resin was heated at a heating rate of 2° C./min in a nitrogen gas atmosphere.

(2) Molding of a plate-shaped article

The shaping feed powder was converted to a continuous plate-shaped article having a thickness of 20 mm, a length of 5 m and a width of 100 mm by the apparatus indicated in FIG. 7, under the following conditions.

Feeding rate of the feed powder: 30 g/min
Reciprocating cycle number of plunger: 5 times/min
Compression ratio (Si/So): 400/100 4
Heating temperature in heat-compression member 21: 277+40=317° C.
Heating temperature in molding member 22: 277+50=327° C.
Temperature of cool-extruding die 23: 277−100=177° C.

The resultant plate-shaped article had a packing of 99.9% and exhibited a good appearance.

Comparative Example 7

The same procedures as those described in Example 15, except that no PTFE resin particles were used, were carried out.

It was found that the motor (not shown in FIG. 7) for driving the reciprocating plunger 16 was stopped due to an overload.

As a result of a thorough investigation of the molding apparatus, it was found that a certain amount of the PMIA resin adhered to and remained in the heat-compression member and the molding member.

The molding procedures were carried out at various temperatures. When the molding temperature was raised, the extrusion operation became possible but the resultant plate had a rough surface and uneven quality.

In the apparatus, it was found that the inside wall surfaces were adhered with the PMIA resin and allowed only a middle portion of the feed to flow through the apparatus.

Example 16

A rod having a diameter of 50 mm and a length of 2 m was produced by the same procedures as mentioned in Example 15, with the following exception.

(1) The shaping feed powder was prepared from 100 parts by weight of the same PMIA resin particles as in Example 15 and 50 parts by weight of an aqueous dispersion containing 5% by weight of the same PTFE resin particles as in Example 15.

(2) The molding apparatus had a feed passage having a circular cross-section.

(3) The molding operation was carried out under the following conditions.

Feeding rate of the feed powder: 20 g/min
Reciprocating cycle number of plunger: 10 times/min
Compression ratio (Si/So): 78.5/12.6=6.2
Heating temperature in heat compression member: 277+48=325° C.
Heating temperature in molding member: 277+48=325° C.
Temperature of cool-extruding die: 277−127=150° C.

The resultant rod had a smooth and uniform surface and was easily processed.

The rod was very useful as an engineering plastic rod.

We claim:

1. A process for producing a shaped wholly aromatic polyamide resin composite article, comprising the steps of:
(a) mixing an aqueous dispersion of polytetrafluoroethylene resin particles in an amount of 0.1% to 10% by weight based on the total weight of the shaped article, the polytetrafluoroethylene resin particles having an average size of from 0.3 to 3 μm, with wholly aromatic polyamide polymer particles comprising at least one type of aromatic polyamide polymer having at least 85 molar % of recurring m-phenyleneisophthalamide units of the formula:

the aromatic polyamide polymer having a melting temperature at least 50° C. higher than the melting temperature of the polytetrafluoroethylene resin particles, and composed of a plurality of primary polyamide particles having an average size of from 0.1 to 2.0 μm aggregated with each other to form secondary porous polyamide particles having an average size of from 30 to 200 μm, to form an aqueous mixture;
(b) drying the aqueous mixture to provide a dried product comprising coated composite particles which are composed of cores consisting of the wholly aromatic polyamide polymer particles and coating layers formed on the cores consisting of the polytetrafluoroethylene resin particles;
(c) preparing a shaping feed powder of a member selected from the group consisting of the product of the drying step (b) and mixtures of the product of the drying step (b) with an additional amount of the wholly aromatic polyamide polymer particles; and
(d) subjecting the shaping feed powder to a shaping procedure in which the shaping feed powder is preheated to a temperature lower than the glass transition temperature of the aromatic polyamide polymer, under compression, and then heat-compressed at a temperature of 30° C. to 70° C. above the glass transition temperature and 20° C. to 80° C. below the melting or decomposition temperature of the aromatic polyamide polymer; the heat-compressed feed is shaped at the temperature above the glass transition temperature and below the melting or decomposition temperature of the polyamide polymer; and the shaped article is cooled, to provide a shaped article wherein the polytetrafluoroethylene resin particles are in the form of fibrils dispersed in a matrix consisting of the wholly aromatic polyamide polymer and connected to each other to form fine networks of the fibrils in the matrix.

2. The process as claimed in claim 1, wherein the polytetrafluoroethylene resin particles in the aqueous dispersion are in a colloidal state.

3. The process as claimed in claim 1, wherein the aqueous mixture comprises a weight ration of the aqueous dispersion of the polytetrafluoroethylene resin particles to the aromatic polyamide polymer particles of 1:4 to 2:1.

4. The process as claimed in claim 1, wherein the shaping procedure is carried out by extruding the heat-compressed feed through a shaping die.

5. The process as claimed in claim 1, wherein in the mixing step, the aqueous dispersion of the polytetrafluoroethylene resin particles is mixed with the aromatic polyamide polymer particles and abrasive inorganic particles.

6. The process as claimed in claim 5, wherein in the mixing step (a), the sum of the aromatic polyamide polymer particles and the abrasive inorganic particles has a weight ratio to the aqueous dispersion of the polytetrafluoroethylene resin particles of from 1:4 to 2:1.

7. The process as claimed in claim 5, wherein in the mixing step, the abrasive inorganic particles are used in an amount of from 1% to 50% by weight based on the total weight of the shaped article.

8. The process as claimed in claim 5, wherein the resultant aqueous mixture of the mixing step containing the abrasive inorganic particles is dried and converted to a mixture of coated composite particles consisting essentially of cores consisting of the aromatic polyamide polymer particles and coating layers consisting of the polytetrafluoroethylene resin particles formed on the cores and additional coated composite particles consisting essentially of cores consisting of the additional inorganic particles and coating layers consisting of the polytetrafluoroethylene resin particles.

9. The process as claimed in claim 4, wherein the shaping feed powder further contains coated particles of cores consisting of the abrasive inorganic particles and coating layers formed on the cores, the coating layers consisting of the polytetrafluoroethylene resin particles.

10. The process as claimed in claim 5, wherein in the heat-compressing procedure, the preheated shaping feed powder is intermittently introduced into a heat-compressing zone by a reciprocating plunger and intermittently heat-compressed in the heat-compressing zone, the resultant heat-compressed feed is introduced into a shaping mold to form the feed into a predetermined shape and the resultant shaped article is extruded through the cooling die.

11. The process as claimed in claim 10, wherein the plunger is reciprocated at a rate of 0.5 to 300 cycles/min.

12. The process as claimed in claim 10, wherein the shaping feed powder is compressed at a compression ratio of 1:1 to 100 in the heat-compressing zone.

13. The process as claimed in claim 10, wherein the intermittent compressing procedure, the feed powder is heated at a temperature between the glass transition temperature and 80° C. above the glass transition temperature of the aromatic polyamide polymer.

14. The process as claimed in claim 10, wherein in cool-extruding procedure, the cooling die has a temperature lower than the glass transition temperature of the aromatic polyamide polymer.

* * * * *